(12) United States Patent
Kwon et al.

(10) Patent No.: US 12,490,148 B2
(45) Date of Patent: Dec. 2, 2025

(54) NETWORK PERFORMING DISTRIBUTED UNIT SCALING AND METHOD FOR OPERATING THE SAME

(71) Applicant: SAMSUNG ELECTRONICS CO., LTD., Suwon-si (KR)

(72) Inventors: Joonhwan Kwon, Suwon-si (KR); Taeyoung Kim, Suwon-si (KR); Hanjung Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 427 days.

(21) Appl. No.: 18/066,684

(22) Filed: Dec. 15, 2022

(65) Prior Publication Data

US 2023/0189077 A1    Jun. 15, 2023

Related U.S. Application Data

(63) Continuation of application No. PCT/KR2022/020005, filed on Dec. 9, 2022.

(30) Foreign Application Priority Data

Dec. 15, 2021 (KR) .................. 10-2021-0180124
Mar. 14, 2022 (KR) .................. 10-2022-0031578

(51) Int. Cl.
*H04W 28/16* (2009.01)
*H04L 41/122* (2022.01)
*H04W 84/04* (2009.01)

(52) U.S. Cl.
CPC .......... *H04W 28/16* (2013.01); *H04L 41/122* (2022.05); *H04W 84/042* (2013.01)

(58) Field of Classification Search
CPC ... H04W 28/16; H04W 84/042; H04W 28/08; H04W 36/12; H04W 88/085;
(Continued)

(56) References Cited

U.S. PATENT DOCUMENTS

2006/0172775 A1   8/2006 Conyers et al.
2010/0144365 A1   6/2010 Pan et al.
(Continued)

FOREIGN PATENT DOCUMENTS

CN    112235753 A    1/2021
EP    4 132 218 A1   2/2023
(Continued)

OTHER PUBLICATIONS

Russian Decision on Grant dated Jan. 13, 2025 for RU Application No. 2024116868.
(Continued)

*Primary Examiner* — Shawn D Miller
(74) *Attorney, Agent, or Firm* — NIXON & VANDERHYE P.C.

(57) ABSTRACT

A method of communication by a radio access network device including a distributed unit (DU) may include obtaining information about resource usage of a first DU executed through a first server by a scaling controller, selecting a second DU based on the information about the resource usage of the first DU by the scaling controller, selecting a second RU to migrate to the second DU from among at least one first remote unit (RU) processing a service of the first DU by the scaling controller, and transmitting information about the second RU to the second DU by the first DU, wherein a remaining RU except for the second RU among the at least one first RU is configured to process the service of the first DU. Other various other embodiments are possible.

20 Claims, 9 Drawing Sheets

(58) Field of Classification Search
CPC ............... H04L 41/122; H04L 41/0896; H04L 67/1008; H04L 67/1074; G06F 9/50
See application file for complete search history.

(56) References Cited

U.S. PATENT DOCUMENTS

| | | | |
|---|---|---|---|
| 2014/0359130 | A1 | 12/2014 | Southern et al. |
| 2016/0029205 | A1 | 1/2016 | Sirotkin |
| 2017/0163342 | A1 | 6/2017 | Testa et al. |
| 2017/0359848 | A1 | 12/2017 | Tenny et al. |
| 2019/0223235 | A1 | 7/2019 | Schwartz et al. |
| 2019/0289509 | A1* | 9/2019 | Padden ............. H04W 36/0044 |
| 2020/0028752 | A1 | 1/2020 | Mehta et al. |
| 2020/0221531 | A1* | 7/2020 | Gao ................... H04W 88/085 |
| 2020/0245344 | A1 | 7/2020 | Krishnaswamy et al. |
| 2021/0059002 | A1 | 2/2021 | Fiorani et al. |
| 2021/0136790 | A1 | 5/2021 | Bidkar et al. |
| 2021/0149745 | A1 | 5/2021 | An et al. |
| 2021/0168653 | A1 | 6/2021 | Arnold et al. |
| 2022/0369182 | A1* | 11/2022 | Gundavelli ..... H04W 36/00835 |
| 2023/0007664 | A1* | 1/2023 | Ravuri ............... H04W 72/1263 |

FOREIGN PATENT DOCUMENTS

| | | |
|---|---|---|
| JP | 2010-033292 A | 2/2010 |
| JP | 2017-526235 A | 9/2017 |
| JP | 2021-158602 A | 10/2021 |
| KR | 10-1189093 B1 | 10/2012 |
| KR | 10-2099274 B1 | 5/2020 |
| KR | 10-2172607 B1 | 11/2020 |
| RU | 2 713 442 C1 | 2/2020 |
| RU | 2 748 302 C1 | 5/2021 |
| WO | WO 2006/4103 A1 | 4/2020 |
| WO | WO 2020/242987 A1 | 12/2020 |

OTHER PUBLICATIONS

Russian Search Report dated Jan. 13, 2025 for RU Application No. 2024116868.
Extended European Search Report dated Oct. 16, 2024 for EP Application No. 22907852.2.
Technical Specification, "5G NG RAN.Architecture Description", Nov. 1, 2020, 80 pages.
Technical Specification, "O RAN Fronthaul Working Gruop Control User and Synchronization Plane Specification", O-RAN.WG4.MP.0-v06.00 Mar. 11, 2021, 300 pages.
Technical Specification, "O RAN Alliance Working Group 4 Management Plane Secification", O-RAN.WG4.CUS.0-v06.00, Mar. 22, 2021, 205 pages.
PCT International Search Report dated Mar. 23, 2023 for PCT/KR2022/020005.
PCT Written Opinion dated Mar. 23, 2023 for PCT/KR2022/020005.
Advanced optical access technologies for next-generation (5G) mobile networks [Invited], vol. 12, No. 10, Oct. 2020, Journal of Optical Communications and Networking, 14pgs.
View on 5G Architecture, Jun. 19, 2019, Version 3.0, 5G PPP Architecture Working Group, 167 pgs Oct. 11, 2020.
Japanese Office Action dated Apr. 8, 2025 for JP Application No. 2024-534630.
RP-140705; 3GPP TSG-RAN #64 Meeting; Discussion on Necessity of the Study on RAN Virtualization dated Mar. 10, 2025.

* cited by examiner

NETWORK PERFORMING DISTRIBUTED UNIT SCALING AND METHOD FOR OPERATING THE SAME

CROSS-REFERENCE TO RELATED APPLICATIONS

This application is a continuation of International Application No. PCT/KR2022/020005, filed Dec. 9, 2022, designating the United States, in the Korean Intellectual Property Receiving Office, and claiming priority to KR Patent Application No. 10-2021-0180124, filed Dec. 15, 2021, and to KR Patent Application No. 10-2022-0031578, filed Mar. 14, 2022, the disclosures of which are all hereby incorporated by reference herein in their entireties.

BACKGROUND

Field

Various embodiments relate to a method for scaling a distributed unit, which may be a separated function of a radio access network, and/or allocation of radio resources.

Description of Related Art

A conventional base station is implemented in the form in which a data processing unit (distributed unit (DU)) and a wireless transmission/reception unit (radio unit or remote unit (RU)) of the base station are together installed in a cell site. However, such an integrated implementation has physical limitations. For example, as service subscribers or traffic increases, the operator needs to establish a new cell site in the base station. To address this issue, the centralized radio access network (C-RAN) or cloud RAN structure has been implemented. The C-RAN may have a structure in which the DU is placed in one physical place, and the RU is placed in the cell site which actually transmits/receives radio signals to/from the user equipment (UE). The DU and the RU may be configured to be connected via an optical cable or a coaxial cable. As the RU and the DU are separated, an interface standard for communication therebetween is needed, and such standards as the common public radio interface (CPRI), are used between the RU and the DU. The 3rd generation partnership project (3GPP) is standardizing base station structures and is in the middle of discussing the open radio access network (O-RAN) which is an open network standard applicable to 5G systems.

In the O-RAN, the RU, DU, central unit-control plane (CU-CP), and central unit-user plane (CU-UP) which may be conventional 3GPP NEs may be an O-RU, O-DU, O-CU-CP, and O-CU-UP, respectively (which may be collectively referred to as O-RAN base stations), and RAN intelligent controller (RIC) and non-real-time RAN intelligent controller (NRT-RIC) have been additionally proposed.

In the next-generation communication system, as a new radio access network (RAN) structure, a radio access network structure including centralized units (CUs), distributed units (DUs) and remote units (RUs) is considered. The radio protocol stack or functions for communication may be split into the CU, DU, and RU in various fashions. In the standard, this is called function split. Splitting RAN functions enables various types of operation depending on the environment of each mobile operator. For example, only the RU device may be installed in the cell site, and the CU and DU may be distributed in the central office or cloud data center and be connected via a fronthaul, saving the overall operation cost. At least one DU may exist under one CU. The radio protocol stack or functions for communication may be split between the CU and the DU in various manners. For example, the PDCP layer/functions may be positioned in the CU, and the RLC/MAC/PHY functions/layers may be positioned in the DU. In another option, the PDCP/RLC layers/functions may be positioned in the CU and the MAC/PHY layers/functions may be positioned in the DU. Likewise, there may be other options for splitting functions between the CU, DU, and RU. In a radio access network structure, due to user equipment (UE) mobility, a UE may move from one DU to another DU within the same CU, or the UE may move from one DU to another DU in different CUs. Or, the UE may detect a radio link failure (RFL) over the source DU and then switch to the target DU in the same or a different CU. The conventional H/W-based CU and DU operation scheme is evolving to operating the CU and DU in a cloud environment which is implemented in software and is based on virtual machine (VM) or container technology.

SUMMARY

The introduction of the cloud environment leads to efficient use of internal resources in providing a service or developing applications, as well as advent of a container-based service capable of fast application distribution and management within a few seconds. However, the container-based micro service should be able to respond to soaring user traffic. Conventional services are often incapable of service switch between container platforms and flexible resource expansion. Accordingly, attention is directed to scaling-out/in methods for balanced use of the resources in the container in the cloud environment.

If merely as much server resource as is capable of processing the data of the RU is dynamically allocated to the DU, the entire server resource as needed may be reduced, but the current NR standard lacks a method for dynamically allocating resource to the DU without UE communication disconnection.

If as much server resource as is needed for average data processing for the RU is allocated to the DU, and the data volume of the RU is increased, traffic may be transferred so that additional DUs are executed by another server, and some of the plurality of RUs which the DU used to be in charge of are processed by newly distributed DUs. If the server resource is dynamically allocated to the DU, the entire resource usage (e.g., CPU, memory, or accelerator) may be reduced. There is needed a method for seamlessly transferring the existing (source) DU-RU-UE (terminal) data flow to a new (target) DU-RU-UE.

Various embodiments describe a method for scaling a DU without disconnecting UE communication.

According to various embodiments, there may be provided a device of a radio access network including a distributed unit (DU) comprising a first DU configured to communicate with at least one first remote unit (RU), a scaling controller (comprising control circuitry) configured to control a scaling process according to a resource state of a first server, and a second DU selected by the scaling controller based on resource usage information about the first DU, wherein the scaling controller may be configured to select a second RU to migrate to the second DU from among first RUs processing a service of the first DU, wherein the first DU may be configured to transmit information about the second RU, which is a migration target) to the second DU, and wherein a remaining RU except for the second RU among the first RUs may be configured to process the service of the first DU. Each DU, RU, CU, UE, and server herein may comprise circuitry such as processing circuitry.

According to various embodiments, there may be provided a method of communication by a radio access network device including a distributed unit (DU) comprising obtaining information about resource usage of a first DU executed through a first server by a scaling controller, selecting a second DU based on the information about the resource usage of the first DU by the scaling controller, selecting a second RU to migrate to the second DU from among first remote units (RUs) processing a service of the first DU by the scaling controller, and transmitting information about the second RU to the second DU by the first DU, wherein a remaining RU except for the second RU among the first RUs may be configured to process the service of the first DU. Other various other embodiments are possible.

Various embodiments enable dynamic scaling of a software, virtual DU in a RAN connected with a UE to support communication, allowing for efficient use of the server resource needed for all the DUs.

According to an embodiment, as much server resource as needed depending on the traffic of the RU is allocated to the DU using the server resource pooling effect of the cloud platform, rather than allocating a dedicated DU to the RU, thereby reducing necessary server resource and servers and thus power consumption.

Various embodiments may seamlessly control the radio bearer from the resource DU, allocated to the UE by the scheduler in charge of radio resource allocation in the DU, to the target DU.

BRIEF DESCRIPTION OF THE DRAWINGS

The above and other aspects, features, and advantages of certain example embodiments will be more apparent from the following detailed description, taken in conjunction with the accompanying drawings, in which.

DETAILED DESCRIPTION

Figure 1A:
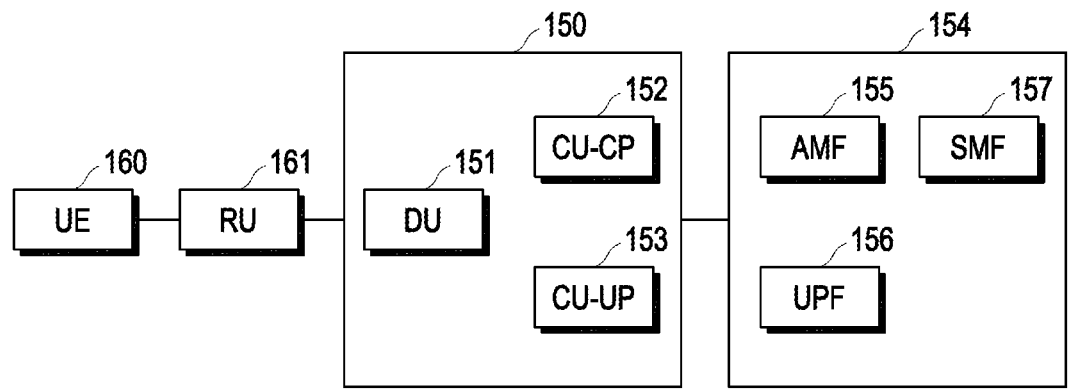
FIG. 1A is a block diagram illustrating a RAN and a core network (CN) according to various example embodiments.

FIG. 1A is a block diagram illustrating a RAN and a core network (CN) according to various embodiments.

According to various embodiments, a RAN 150 may include at least one distributed unit (DU) 151, at least one central unit-control plane (CU-CP) 152, or at least one central unit-user plane (CU-UP) 153. Although the RAN 150 is illustrated as being connected to at least one remote unit or radio unit (RU) 161, this is exemplary and at least one RU 161 may be configured to be connected to, or included in, the RAN 150. The RAN 150 may be an O-RAN and, in this case, the DU 151 may be an O-DU, the CU-CP 152 may be an O-CU-CP, the CU-UP 153 may be an O-CU-UP, and the RU 161 may be an O-RU. Each "unit" herein may comprise circuitry.

According to various embodiments, the RU 161 may perform communication with a user equipment (UE) 160. The RU 161 may be a logical node that provides a low-PHY function and RF processing. The DU 151 may be a logical node that provides the functions of RLC, MAC, and a higher physical layer (high-PHY) and be configured to be connected to, e.g., the RU 161. The CUs 152 and 153 may be logical nodes that provide the functions of radio resource control (RRC), service data adaptation protocol (SDAP), and packet data convergence protocol (PDCP). The CU-CP 152 may be a logical node that provides the functions of the control plane portions of RRC and PDCP. The CU-UP 153 may be a logical node that provides the functions of the user plane portions of SDAP and PDCP.

According to various embodiments, the core network (e.g., 5GC 5th generation core) 154 may include at least one of an access and mobility management function (AMF) 155, a user plane function (UPF) 156, or a session management function (SMF) 157. The AMF 155 may provide functions for access and mobility management in units of the UE 160. The SMF 157 may provide session management functions. The UPF 156 may transfer the downlink data received from the data network to the UE 160 or transfer the uplink data received from the UE 160 to the data network. For example, the CU-CP 152 may be configured to be connected, directly or indirectly, to the AMF 155 through an N2 interface (or an NGAP interface). The AMF 155 may be configured to be connected, directly or indirectly, to the SMF 157 through an N11 interface. The CU-UP 153 may be configured to be connected, directly or indirectly, to the UPF 156 through an N3 interface.

Figure 1B:
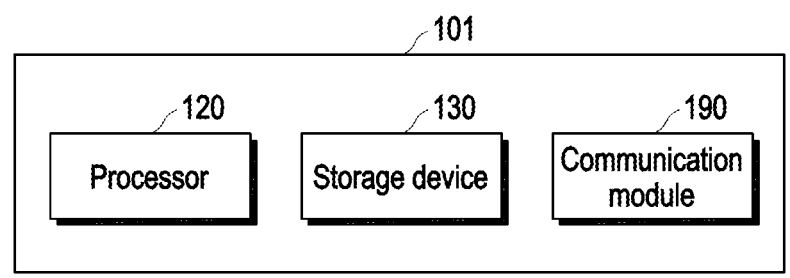
FIG. 1B is a block diagram illustrating a hardware configuration of a RAN device according to various example embodiments.

FIG. 1B is a block diagram illustrating a hardware configuration of a network device according to various embodiments.

According to various embodiments, the RAN device may include at least one of a processor 120 comprising processing circuitry, a storage device 130, or a communication module 190 comprising communication circuitry.

According to various embodiments, the processor 120 may execute, e.g., software (e.g., a program) to control at least one other component (e.g., a hardware or software component) of the RIC 101 (or an electronic device configured to perform the functions of the RIC 101) connected with the processor 120 and may process or compute various data. The software may include, e.g., xAPP, but is not limited thereto. According to an embodiment, as at least part of data processing or computation, the processor 120 (comprising processing circuitry) may store commands or data received from another component in the storage device 130, process commands or data stored in the storage device 130, and store the resultant data in the storage device 130. According to an embodiment, the processor 120 may include at least a portion of a central processing unit, an application processor, a neural processing unit (NPU), or a communication processor, but the type of the processor 120 is limited. The neural network processing device may include a hardware structure specialized for processing an artificial intelligence model. The artificial intelligence model may include machine learning (e.g., reinforcement learning, supervised learning, unsupervised learning, or semi-supervised learning), but is not limited to the above-described examples. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure. It will be appreciated by one of ordinary skill in the art that the storage device 130 is not limited as long as it is a device capable of storing data, such as a disk (e.g., HDD).

According to various embodiments, the storage device 130 may store various data used by the processor 120 or the communication module 190. The various data may include, for example, software and input data or output data for a command related thereto.

According to various embodiments, the communication module 190 may establish a direct (e.g., wired) communication channel or a wireless communication channel between the RAN device and an external electronic device or support communication through the established communication channel. The type of the communication module 190 is not limited as long as it is capable of supporting, e.g., an E2 interface. Meanwhile, when the RAN 150 is implemented as a single device, the communication module 190, comprising communication circuitry, may be and/or indicate an interface for both entities.

In the communication system, as a new radio access network (RAN) structure, a radio access network structure including centralized units (CUs), distributed units (DUs) and remote units (RUs) is considered. The radio protocol stack or functions for communication may be split between the CU and DU in various fashions. In the standard, this is called function split. Splitting RAN functions enables various types of operation depending on the environment of each mobile operator. In an example, only the RU device may be installed in the cell site, and the CU and DU may be configured to be distributed in the central office or cloud data center and be connected via a fronthaul, saving the overall operation cost. One or more DUs may exist under one CU. The radio protocol stack or functions for communication may be split between the CU and the DU in various manners. For example, in one option, the PDCP layer/functions may be positioned in the CU, and the RLC/MAC/PHY functions/layers may be positioned in the DU. In another option, the PDCP/RLC layers/functions may be positioned in the CU and the MAC/PHY layers/functions may be positioned in the DU. Likewise, there may be other options for splitting functions between the CU and DU. In a radio access network structure, due to user equipment (UE) mobility, a UE may move from one DU to another DU within the same CU, or the UE may move from one DU to another DU in different CUs. Or, the UE may detect a radio link failure (RFL) over the serving DU and then switch to the target DU in the same or a different CU.

Figure 2A:
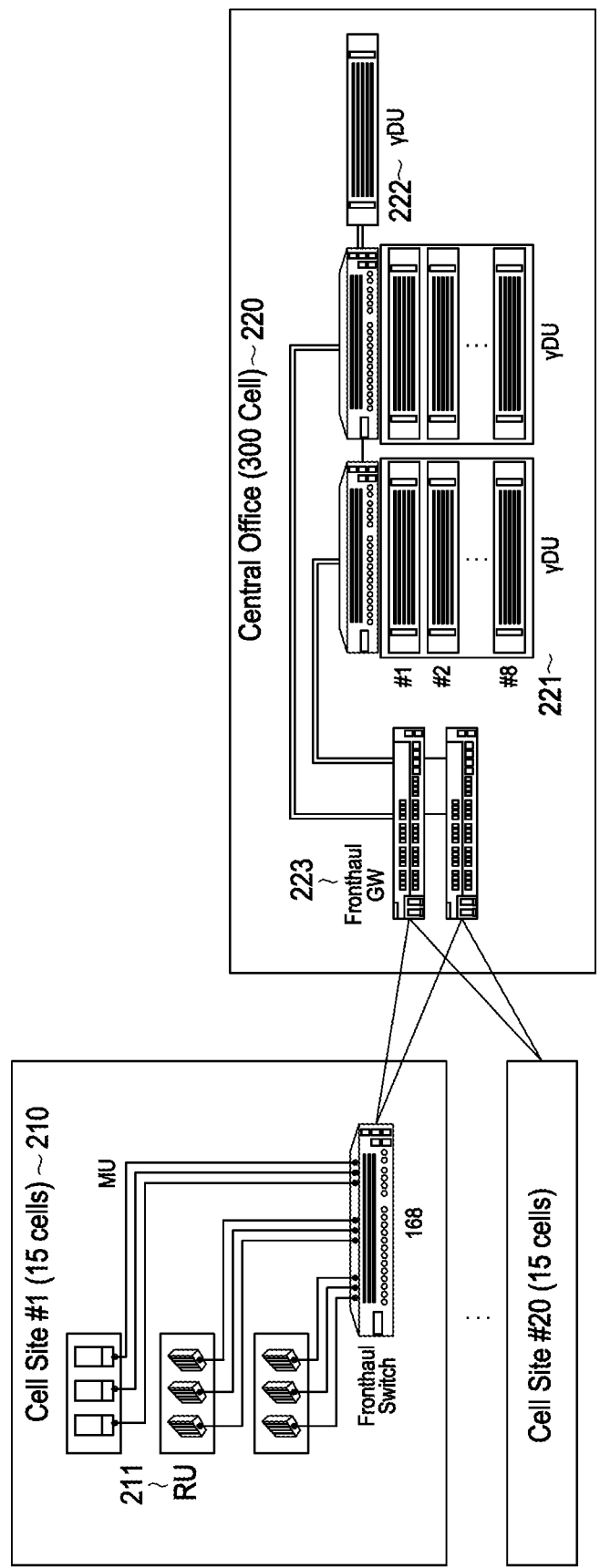
FIG. 2A illustrates a cell site and a central office in a RAN system according to various embodiments.

FIG. 2A illustrates a cell site and a central office in a RAN system according to various embodiments.

In the next-generation communication system, splitting RAN functions enables various types of operation depending on the environment of each mobile operator. For example, only at least one RU 211 device may be installed in the cell site 210, and the CU 222 (or virtual CU) and at least one DU 221 (or virtual DU) may be configured to be distributed in the central office 220 or cloud environment (e.g., a cloud data center) and be connected via a fronthaul (FH) 223, saving the overall operation cost. At least one DU 221 may correspond to (or be connected to) one CU 222. In contrast to the conventional H/W-based CU and DU operation scheme, the CU and/or DU may be implemented in software. For example, the CU and/or DU may be operated in a cloud environment based on a virtual machine (VM) or container technology.

Figure 2B:
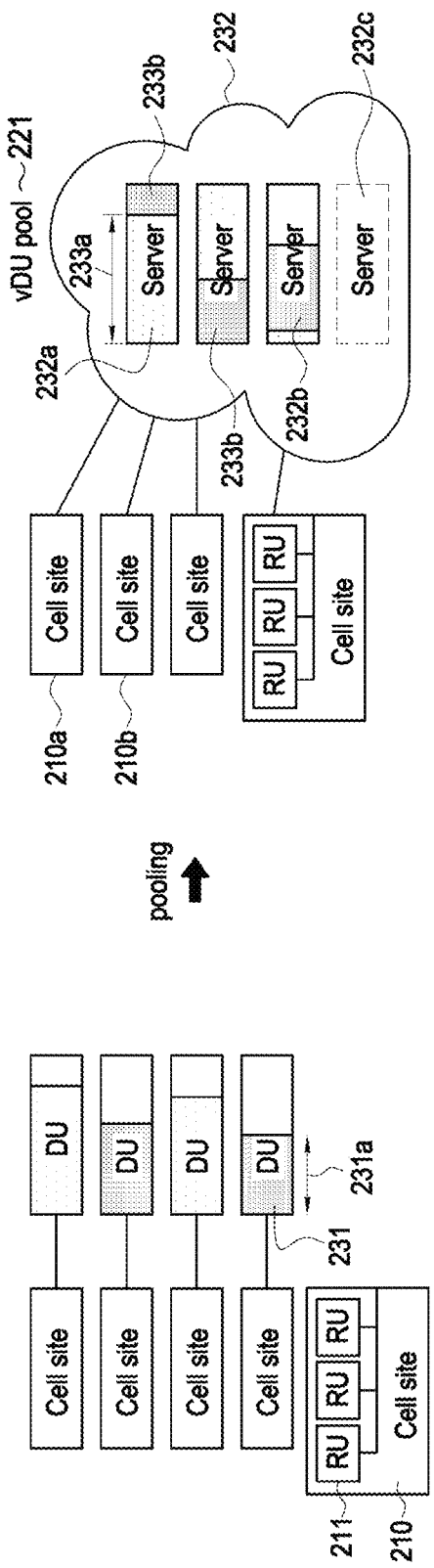
FIG. 2B illustrates a server and a resource pool in a cloud environment according to various example embodiments.

FIG. 2B illustrates a server and a resource pool in a cloud environment according to various embodiments.

Referring to the embodiment shown on the left side of FIG. 2B, at least one DU 231 may be respectively configured to be connected to each of the at least one cell site 210. For example, one or more RUs 211 may correspond (or be connected) to one cell site 210. According to the embodiment shown on the left, as an example, one DU 231 may be fixedly correspond (or connected) to one cell site 210. In this case, a dedicated DU for the cell site 210 (or an entity (e.g., one or more RUs 211) constituting the cell site 210) may be set, so that the DU 231 may be referred to as a dedicated DU as an example. That a dedicated DU is set for one cell site 210 may be interpreted as setting the dedicated DU for one or more RUs 211 constituting one cell site 210. For the execution of each dedicated DU, the network device must allocate (or execute) a server (e.g., a VM or a container) for each dedicated DU, and for the execution of the server, a resource of a designated size or more must be allocated. The resource of the designated size or more may be preset or variable. Meanwhile, referring to the left side of FIG. 2B, a bar-shaped indicator 231a is displayed on each of the at least one DU 320a and 320b. Each indicator 231a may indicate a ratio of the resource currently being used by each of the at least one DU 231 to the maximum resource available in the at least one DU 231. The maximum available resource may be, e.g., the maximum available resource allocated to the server (e.g., a VM or a container) for executing the dedicated DU. As in the embodiment shown on the left side of FIG. 2B, if a dedicated DU corresponds (or connects) to the cell site, the overall resource available in one DU (e.g., the DU 231) may not be used, causing idle resource and resulting in resource waste in the network device. As an example, the available resource may be determined under the assumption that the maximum number of UEs are configured to be connected to one or more RUs 211. Thus, if UEs fewer than the maximum number are configured to be connected to the RU 211, idle resource may be caused. However, as fixed resource is allocated for one or more RUs 211, idle resource cannot be used.

Referring to the embodiment on the right side of FIG. 2B, rather than allocating a dedicated DU 231 to the RU 211, a server pool 232 is placed in the cloud environment to use the resource pooling function. In contrast to the embodiment on the left side of FIG. 2B, rather than allocating a dedicated DU for one cell site, one server (e.g., the server 232b) may perform the functions corresponding to the RUs included in the plurality of cell sites. For example, the server 232b may perform the function corresponding to the RU included in one cell site while performing the function corresponding to the RU included in another cell site. The network device may determine the server to perform the corresponding function in units of RU (or in units of the UEs included in the RU). Accordingly, as shown on the right side of FIG. 2B, one server (e.g., the server 232a) may allocate a resource 233a for performing the function corresponding to the RU included in the first cell site 210a and a resource 233b for performing the function corresponding to the RU included in the second cell site 210b. Thus, the server 232a may allocate the idle resource, left after allocating the resource 233a for processing the first cell site 210a, to the resource 233b for processing at least one RU included in the second cell site 210b, minimizing or reducing idle resources. The server 232c to which no resource has been allocated may not be used.

Referring to FIG. 2B, a remaining portion 232b of at least one server and the server 232c indicated by the dashed line may mean extra servers not allocated for performing the function of the DU, i.e., the resource of the server not allocated, and the network device does not drive the extra server or does not allocate resource to the extra server, thereby preventing or reducing resource waste.

Referring to FIG. 2B, one or more RUs 211 constituting one cell site 210 are allocated for each dedicated DU 231. However, if the server pool 232 is used, the resource of any server in the server pool 232 may be allocated by the amount of traffic required by the RU 211 according to resource pooling. Accordingly, in the central office 220, the number of servers driven to perform the function of the DU 221 may be reduced through the server pool 232.

Figure 3A:
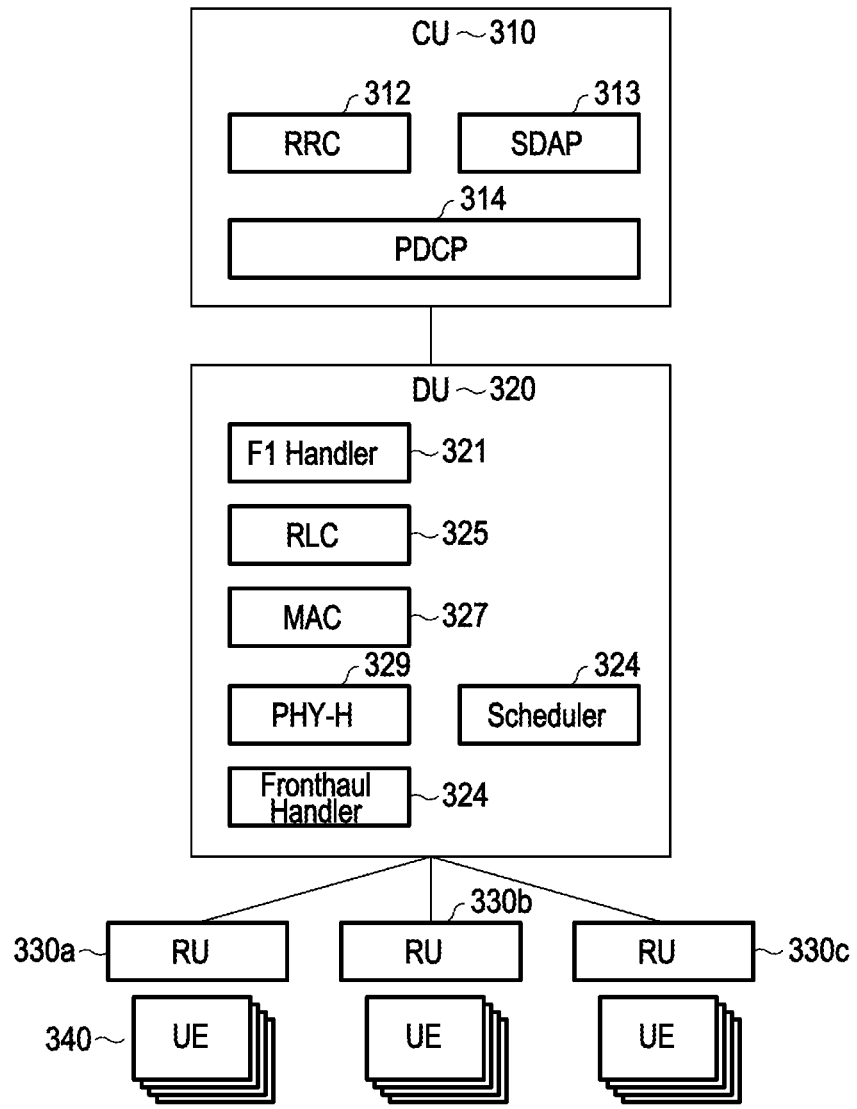
FIG. 3A is a block diagram illustrating network components according to various example embodiments.

FIG. 3A is a block diagram illustrating network components according to various embodiments. Each embodiment herein may be used in combination with any other embodiment(s) described herein.

According to various embodiments, the radio protocol stack or functions for communication may be split between the CU 310 and the DU 320 in various manners. As an example, the packet data convergence protocol (PDCP) 314/RRC 312/SDAP 313 layer/functions may be positioned in the CU 310, and RLC 325/MAC 327/PHY 239 functions/layers may be positioned in a DU 320. In another option, the PDCP 314/RRC 312/SDAP 313 layers/functions may be positioned in the CU 310, and the RLC 325/MAC 327 layers/functions may be positioned in the DU 320. Likewise, there may be other options for splitting functions between the CU 310 and DU 320. In the radio access network structure, due to user equipment (UE) mobility, the UE 340 may move between the RUs 330a, 330b, and 330c within the same DU 320, or move to the RU configured to be connected, directly or indirectly, to a DU other than the DU 320. Or, the UE 340 may detect a radio link failure (RFL) over the same DU 320 and then switch to a DU other than the DU 320 in the same CU 310 or a different CU.

According to various embodiments, the three-tier structure of the CU 310, DU 320, and RU 330 constituting the RAN may constitute a 5G base station (gNB) for flexibly establishing a 5G RAN for various 5G applications (eMBB, URLLC, mMTC, etc.).

Referring to FIG. 3A, the base station may be divided into a three-tier structure, so that the RRC, SDAP, and PDCP may be classified as CUs, RLC, MAC, and high PHY as DUs, and low PHY as an RU. Specifically, midhaul channels may be positioned between the CU 310 and the DU 320, and fronthaul channels may be positioned between the DU 320 and the RU 330. Separation points of functions are not limited to those shown in the drawings.

Figure 3B:
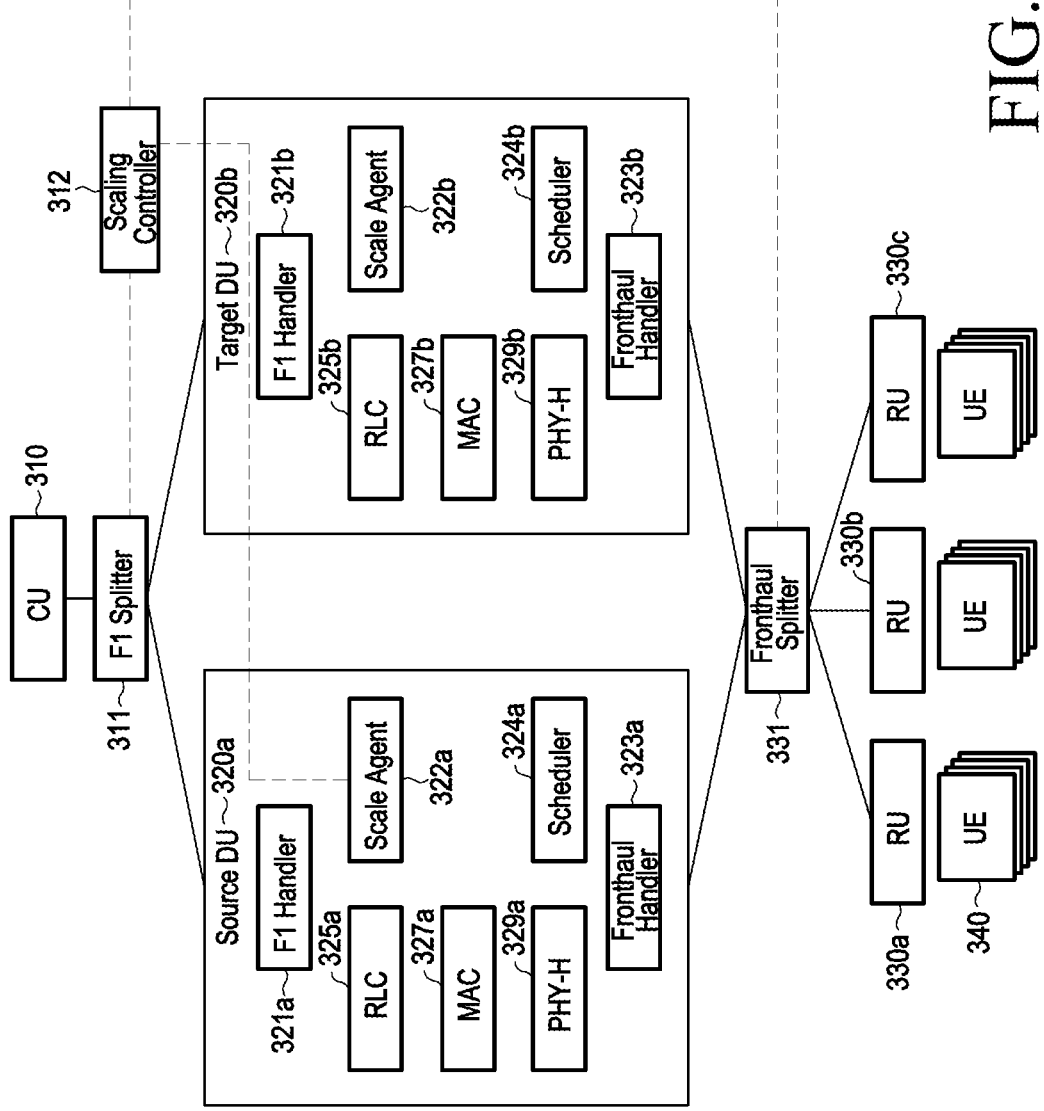
FIG. 3B is a block diagram illustrating a network including a plurality of DUs according to various example embodiments.

FIG. 3B is a block diagram illustrating a network including a plurality of DUs according to various embodiments.

According to various embodiments, the network device may include and execute a CU 310, at least one DU (e.g., the source DU 320a and target DU 320b of FIG. 3B), a scaling controller 312, an F1 splitter 311 decoupling the at least one DU 320a and 320b and the CU 310, a scaling controller 312 controlling the scaling process, an F1 handler 321a or 321b, a scale agent 322a or 322b, an RLC 325a or 325b, a MAC 327a or 327b, a PHY-H 329a or 329b, a scheduler 324a or 324b, and a fronthaul handler 323a or 323b included in each of the at least one DU, a fronthaul splitter 331 decoupling at least one RU 330a, 330b, and 330c and the at least one DU 320a and 320b, and at least one UE 340 respectively corresponding to the at least one RU 330a, 330b, and 330c.

According to various embodiments, the CU 310 may transfer downlink data to the UE 340 in the data flow of the UE on the U-plane or transfer the uplink data received from the UE 340 to the network. The description of FIGS. 1A to 3A may be applied to the description of the CU 310.

According to various embodiments, referring to the 3GPP F1 interface standard, the F1 splitter 311 provides the decoupling function between the CU 310 and the DU 320a or 320b. There may be provided a function in which the CU 310 may recognize the source DU 320a and the target DU 320b as a single DU. The data flow path (IP address translation) between the CU 310 and the source DU 320a or target DU 320b may be controlled. The F1 splitter 311 may be a standalone component or be a component included in the CU 310.

According to various embodiments, the scaling controller 312, comprising control circuitry, may control overall scaling. Referring to FIG. 3B, the scaling controller 312 may communicate with the source DU 320a, the target DU 320b, the F1 splitter 311, and the fronthaul splitter 331. According to various embodiments, the scaling controller 312 may receive a report for resource usage from the source DU 320a to determine whether the source DU 320a needs scaling-out. If scaling-out is determined to be needed, the scaling controller 312 may request a cloud platform, e.g., Kubernetes, to create a new target DU 320b. The scaling controller 312 may be configured to transmit information about the target DU 320b to the F1 splitter 311 and the fronthaul splitter 331 to register the target DU 320b with the F1 splitter 311 and the fronthaul splitter 331. Or, the scaling controller 312 may instruct the scale agent 322a or 322b to transmit information about the target DU 320b to the F1 splitter 311 and the fronthaul splitter 331 to register the target DU 320b with the F1 splitter 311 and the fronthaul splitter 331. Each RU herein, each CU herein, each UE herein, and each DU herein, may comprise processing circuitry.

According to various embodiments, the description of FIGS. 1A to 3A may be applied to the DU 320a or 320b. Referring to FIG. 3B, the source DU 320a may include an F1 handler 321a, a scale agent 322a, a fronthaul handler 323a, a scheduler 324a, an RCL 325a, a MAC 327a, and a PHY-H 329a. According to various embodiments, the source DU 320a may report resource usage to the scaling controller 312 through the scale agent 322a periodically or according to a predetermined condition. According to an embodiment, the target DU 320b to which traffic processing is migrated from the source DU 320a may include an F1 handler 321b, a scale agent 322b, a fronthaul handler 323b, a scheduler 324b, an RLC 325b, a MAC 327b, and a PHY-H 329b. The scale agent 322b of the target DU 320b may receive information for context synchronization from the scale agent 322a of the source DU 320a.

According to various embodiments, the F1 handler 321a or 321b may be a component configured to communicate with the CU 310 in the DU 320a or 320b and may follow the 3GPP F1 interface standard.

According to various embodiments, the fronthaul handler 323a or 323b may be a portion configured to communicate with the RU 330 in the DU 320 and may follow the ORAN fronthaul standard (7.2x) or the nFAPI of the small cell forum.

According to various embodiments, according to the ORAN fronthaul standard, the fronthaul (FH) splitter 331 may provide a decoupling function between the DU 320a or 320b and the RU 330a, 330b or 330c. There may be provided a function in which the RU 330a, 330b, or 330c may recognize the source DU 320a and the target DU 320b as a single DU. The data flow path (MAC address translation) between the RU 330a, 330b, or 330c and the source DU 320a or target DU 320b may be controlled. According to various embodiments, the fronthaul splitter 331 may be a standalone component or be a component included in the RU 330.

Figure 3C:
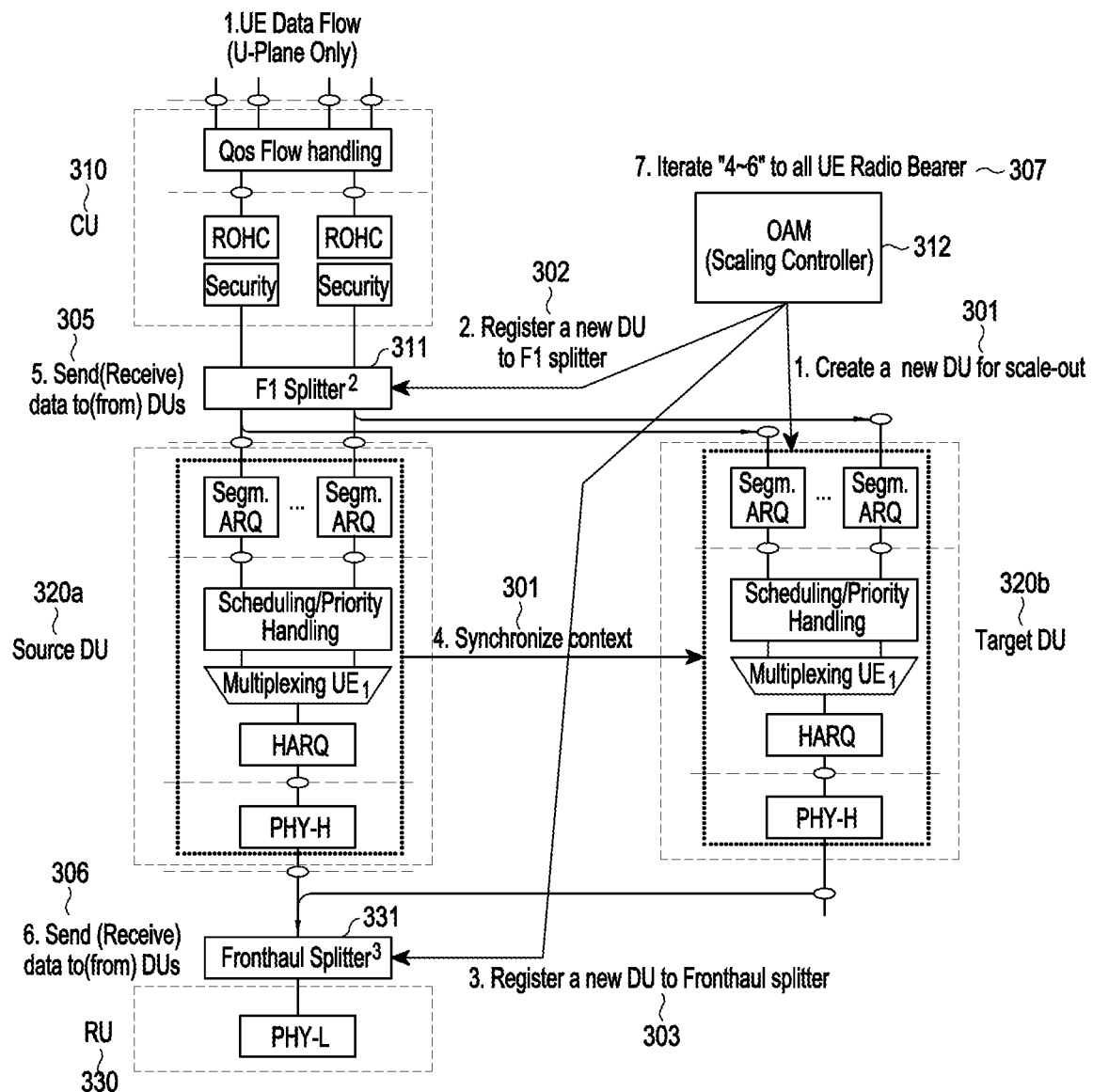
FIG. 3C illustrates a data flow of a DU and transfer of the data flow.

According to various embodiments, the RU 330 may communicate with the UE 340. The RU 330 may be a logical node that provides a low physical function (PHY-low) and RF processing. The RU 330 may be configured to be connected to or included in the RAN. The description of FIGS. 1A to 3A may be applied to the description of the RU 330. FIG. 3C illustrates a data flow of a DU and transfer of the data flow.

According to various embodiments, the user equipment (UE) 340 may move from one DU (e.g., the source DU 320a of FIG. 3B) in the same CU 310 to another DU (e.g., the target DU 320b of FIG. 3B) due to the mobility of the UE in the radio access network structure. Or, the UE 340 may move from one DU (e.g., the source DU 320a of FIG. 3B) to another DU (e.g., the target DU 320b of FIG. 3B) in a different CU. As an example, the UE 340 may detect a radio link failure (RLF) over one DU (e.g., the source DU 320a of FIG. 3B) and switch to another DU (e.g., the target DU 320b of FIG. 3B) in the same CU 310 or a different CU.

Referring to FIG. 3C, it will be appreciated by one of ordinary skill in the art that the target DU 320b may be a DU generated (301) by the scaling controller 312 for scaling out or the generation process by the target DU 320b may be replaced with designating an existing generated DU for scaling out. The scaling controller 312 may be configured to transmit information about the target DU 320b to the F1 splitter 311 comprising circuitry, so that the F1 splitter 311 may register a new DU (302). As an example, in the source DU 320a, at least one event for scaling out may be detected, and in response to the detected event, the target DU 320b for scaling out may be generated (or designated). Here, the event may indicate that the ratio of the currently used resource to the overall resource available to the source DU 320a (or the server for driving the source DU 320a) is a threshold ratio or more, but this is exemplary, and it will be appreciated by one of ordinary skill in the art that it is not limited as long as it is a condition indicating that the resource used by the source DU 320a is relatively excessive so that scaling out is required. The scaling controller 312 may be configured to transmit information about the new DU to the fronthaul splitter 331 to register (303) the information about the new DU. The current source DU 320a may be configured to transmit context to the target DU 320b to synchronize the context with the target DU 320b. For example, the context may include at least one of system information (which may include synchronization, system information block, random access, and reference signal), scheduling context (which may include channel state, power management, HARQ, and DRX), control information (which may include information about MAC-CE and paging), frequency resource (which may include information about carrier aggregation, BWP, and SUL), spatial resource (which may include information about beam management and MINO), UE context (which may include information about RNTI, SRB, DRB, and RAT), or RU context. Here, the context may be associated with an RU (or at least one UE configured to be connected to the RU) requiring migration among at least one RU 330 corresponding to (or connected to) the source DU 320a, but is not limited thereto. The target DU 320b may receive the above-described context, so that information about the RU to be migrated (or at least one UE connected to the RU) may be identified. The F1 splitter 311 may prepare for data to be transmitted or data 305 to be received according to downlink/uplink resource allocation information about the target DU 320b. The fronthaul splitter 331 may be configured to receive the prepared transmission data according to the downlink/uplink resource information allocated for the target DU 320b or transmit it to the target DU 320b (306). The above-described operations may be repeated (307) for each UE so that the data flow is migrated to the target DU 320b for at least one UE configured to be connected via data radio bearer with the RU (e.g., 330c) in charge of the target DU 320b for operations 301 to 306 of FIG. 3C described above. Accordingly, information about at least one UE configured to be connected to the RU 330c to be scaled out may be provided to the target DU 320b, and a transmission and/or reception procedure of downlink data and/or uplink data associated with at least one UE may be managed.

Figure 4:
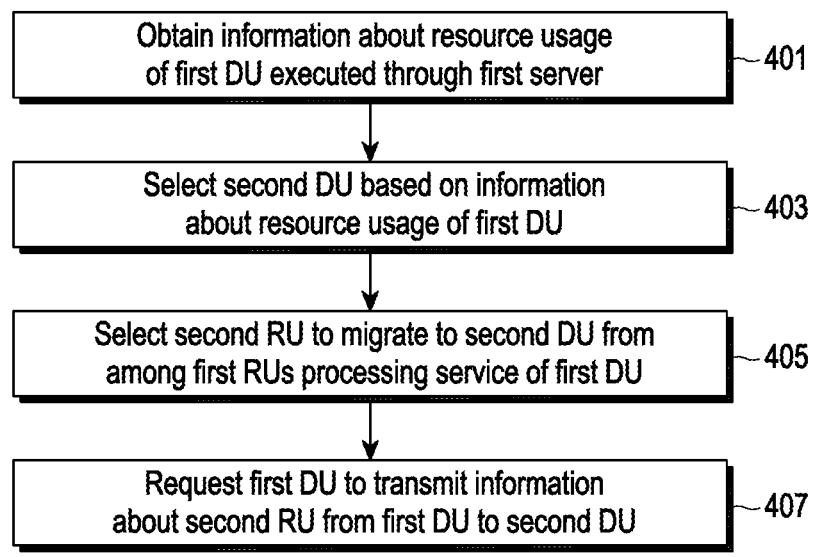
FIG. 4 illustrates operations by a scaling controller according to various example embodiments.

FIG. 4 illustrates operations by a scaling controller according to various embodiments.

According to various embodiments, in the radio access network device, as an operation of the scaling controller (312 of FIG. 3B), information about the resource usage of the first DU (source DU, 320a of FIG. 3B) executed through the first server may be obtained from the first DU 320a. The scaling controller 312 may select (403) the second DU (target DU, 320b of FIG. 3B) based on the information about the resource usage of the first DU 320a by 312 of FIG. 3B. The second RU (e.g., 330b and/or 330c of FIG. 3B) to be migrated to the second DU (e.g., 320b of FIG. 3B) may be selected (405) from among the first RUs (e.g., 330a, 330b, and 330c of FIG. 3B) which are processing the service of the first DU 320a by the scaling controller 312. A request 407 may be sent to establish a communication session to the first DU 320a so that information about the second RU (e.g., 330c of FIG. 3B) is transmitted from the first DU 320a to the second DU 320b by the scaling controller 312.

Figure 5A:
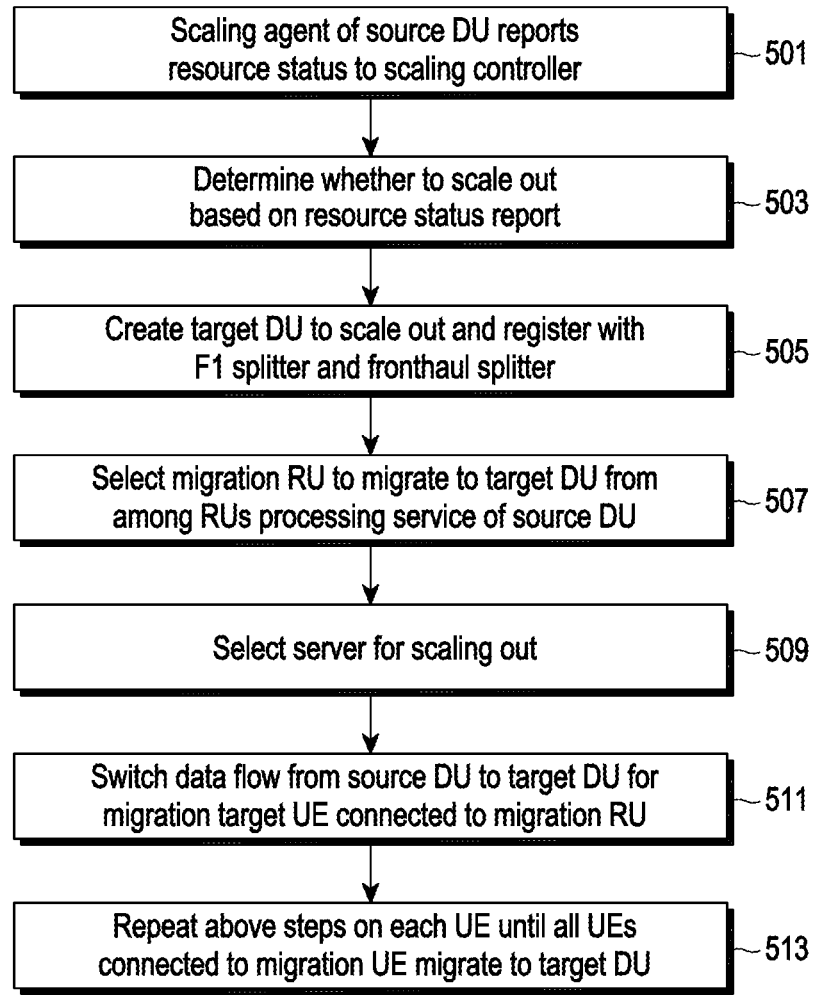
FIG. 5A illustrates a scale-out process by a scaling controller in a cloud environment depending on resource usage of a DU.
Figure 5B:
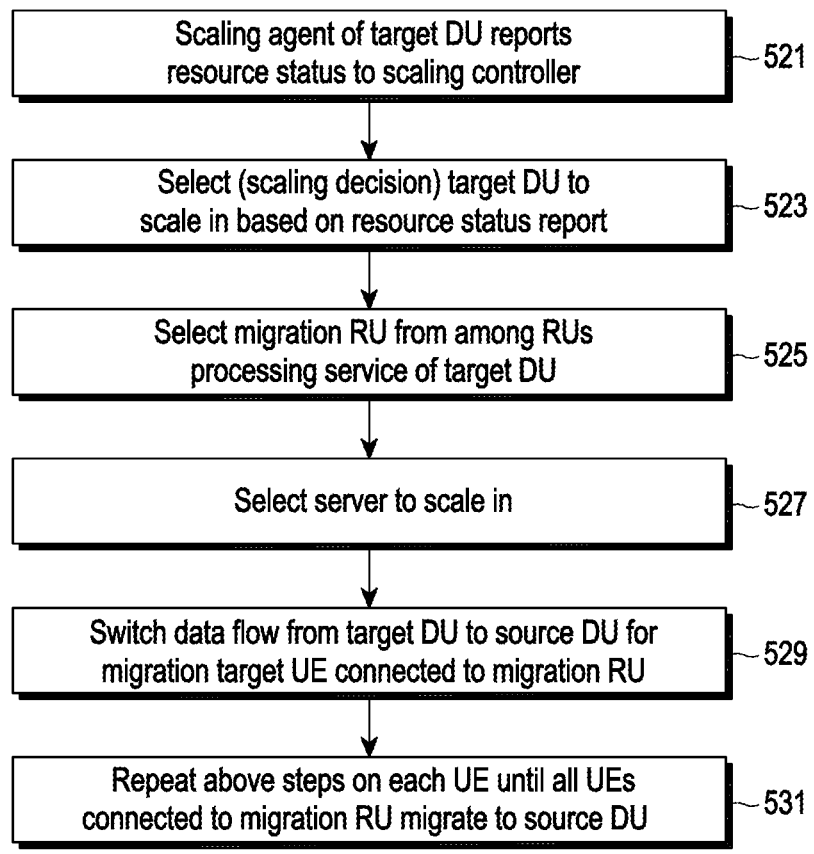
FIG. 5B illustrates a scale-in process by a scaling controller in a cloud environment depending on resource usage of a DU.

FIGS. 5A and 5B illustrate a scale-out and a scale-in process by a scaling controller in a cloud environment depending on resource usage of a DU.

According to various embodiments, when an application or workload running on cloud is being executed on virtual machine VM or logical partition which causes performance deterioration or memory shortage, container-based scaling out or scaling in may be performed.

Referring to FIG. 5A, the source DU 320a may report (501) resource status to the scaling controller 312. The scaling controller 312 may determine (503) whether to scale out based on the reported resource status. The scaling controller 312 may generate a target DU 320b to scale out. The scaling controller 312 may register (505) information about the target DU 320b with the F1 splitter or fronthaul splitter. The scaling controller 312 may select (507) a target RU (e.g., 330c of FIG. 3B) to be migrated to the target DU 320b from among the RUs (e.g., 330a, 330b, and 330c of FIG. 3B) which are processing the source DU 320a. The scaling controller 312 may select (509) a server (e.g., 232b or 232c of FIG. 2B) for scaling out. The scaling controller 312 may switch (511) the data flow, for the UE 340 which is the migration target configured to be connected to the migration target RU (e.g., 330c of FIG. 3B), from the source DU 320a to the target DU 320b. The scaling controller 312 may repeat (513) the immediately before switching operation for each UE until all UEs 340 configured to be connected to the migration target RU (e.g., 330c of FIG. 3B) are migrated to the target DU 320b. "Based on" as used herein covered based at least on.

Referring to FIG. 5B, the target DU 320b may report (521) the resource status to the scaling controller 312. Based on the reported resource status, the scaling controller 312 may determine whether to scale in, and the scaling controller 312 may select (523) the target DU 320b to scale in. The scaling controller 312 may select (525) a target RU (e.g., 330c of FIG. 3B) to be migrated to the source DU 320a from among the RUs (e.g., 330a, 330b, and 330c of FIG. 3B) which are processing the target DU 320b. The scaling controller 312 may select (527) a server (e.g., 232b of FIG. 2B) for scaling in. The scaling controller 312 may switch (529) the data flow, for the UE 340 which is the migration target configured to be connected to the migration target RU (e.g., 330c of FIG. 3B), from the target DU 320b to the source DU 320a. The scaling controller 312 may repeat (531) the immediately before switching operation for each UE until all UEs 340 configured to be connected to the migration target RU (e.g., 330c of FIG. 3B) are migrated to the source DU 320a.

A specific process may be as follow.

1) Scaling Out Process a) The scaling agent 322 may periodically report the resource status, such as CPU usage of DU (320) server comprising processing circuitry, memory usage, network throughput, power consumption, accelerator usage (FPGA/GPU/smart NIC), etc., to the scaling controller 312. According to various embodiments, the scaling agent 322 may report the resource status when a resource use condition preset by the scaling controller 312 is satisfied, instead of periodically reporting.

b) The scaling controller 312 may select (scaling decision) the DU 320 to scale out based on the resource usage information of the DU 320 and select the RU 330 to switch to another server from the RUs 330a, 330b, and 330c processing the DU service and process it. According to various embodiments, selection of the source DU 320a to scale may be made by various policies. For example, if the server resource allocated to the source DU 320a has been allocated to process three RUs and 30% of the peak throughput, the scaling out of the corresponding DU may be started when the overall throughput becomes 60% (30%×2) of the overall throughput. Or, the optimal DU to scale may be selected through artificial intelligence/machine learning technology. According to various embodiments, the scaling controller 312 may generate the target DU 320b which is a new DU to scale out and register the target DU 320b with the F1 splitter 311. The scaling controller 312 may register the target DU 320b with the fronthaul splitter. According to various embodiments, the selection of the RU 330 may be performed by various policies. As an example, an RU having a throughput smaller than the average among the RUs 330 processing the service of the source DU 320a in the current server (e.g., 232a of FIG. 2B) may be selected to execute the service of the target DU 320b in another server (e.g., 232b of FIG. 2B), and be transferred to the target DU 320b to be processed by the corresponding RU. Or, the RU with the largest throughput may be selected, and the target DU 320b may be executed in the server having the capacity of being capable of processing the peak rate, and the target DU 320b may be allowed to process the corresponding RU. Each DU herein may comprise processing circuitry.

c) The scaling controller 312 may select (scale out server selection) a server (e.g., 232b in FIG. 2b) with sufficient processing capacity in the target DU 320b for the new service and execute the service on the server. According to various embodiments, the selection of the server for executing the target DU 320b service may be performed according to various policies. As an example, a server capable of processing maximum data for one RU 330 may be selected or a server capable of average processing may be selected. The selection of a server for scaling out is related to the policy of selecting a scaling out target RU 330. If the scaling out target RU 330, e.g., the RU where processing is migrated to the target DU 320b service should process the peak rate, the service of the target DU 320b may be executed on the server with the resource capacity capable of processing the corresponding traffic. Executing the target DU 320b service on the server with necessary resources may be performed through a cloud platform such as Kubernetes. The scaling controller 312 may provide resource information necessary for the cloud platform to be able to select the server to execute the service of the DU.

d) The scaling controller 312 may allow the service of the target DU 320b to be registered with the F1 splitter 311. For example, the F1 splitter 311 prepares to transmit (switch) the data, which is transmitted to the source DU 320a, to the target DU 320b using the registered information. If necessary, the F1 splitter 311 may create a new stream control transmission protocol (SCTP) communication session with the target DU 320b. (transport network layer connection)

e) The scaling controller 312 may allow the service of the target DU 320b to be registered with the FH splitter 331. (including transport network layer connection)

For example, the FH splitter 331 may prepare to transmit (switch) the data, which is transmitted to the source DU 320a, to the target DU 320b using the registered information.

f) The scaling controller 312 may instruct creation of a communication session for synchronizing context between the scale agents 322 in the source DU 320a and the target DU 320b.

g) The scale agent 322a of the source DU 320a may start transmitting the context for the RU 330 that is the migration target to the scale agent 322b of the target DU 320b and continue updating changes in the context. The transmitted context may be information about UE context, channel state, radio resource scheduling information, and system information.

h) The scale agent 322a may select a UE to be processed in the target DU 320b from among UEs configured to be connected, directly or indirectly, to the RU 330 that is the migration target. According to various embodiments, the selection of the UE may be performed by various policies. As an example, shifted from the UE in the inactive state, the UE may be sequentially selected from among the UEs in the connected state in order from the UE with smallest data transmissions to the UE with the largest data transmissions. The reverse order is also possible. Or, the DRB QoS values of the UEs may be compared, and selection may be performed in order of lower priority.

i) The scale agent 322a of the source DU 320a may transmit information about the UE which is the migration target to the scale agent 322b of the target DU 320b. As an example, the transmitted UE information may include, e.g., signaling ratio bearer (SRB) list and data radio bearer (DRB) list.

j) The scale agent 322a of the source DU 320a may request the F1 splitter 311 to send data, which is directed to the migration target UE, to the target DU 320b. According to various embodiments, the F1 splitter 311 may transmit all data which goes to the migration target UE to the target DU 320b (switch the data path from the source DU 320a to the target DU 320b).

k) The scale agent 322a of the source DU 320a may request the scheduler of the source DU 320a to stop uplink/downlink resource allocation for the migration target UE.

l) The scale agent 322a of the source DU 320a may transmit the uplink/downlink data currently remaining in the scale agent 322b of the target DU 320b.

m) The target DU 320b may reset the buffer with the data received from the F1 splitter 311 and the source DU 320a and prepare to transmit/receive data for the UE.

n) The scale agent 322b of the target DU 320b may notify the scale agent 322a of the source DU 320a that data transmission/reception preparation for the UE has been complete.

o) The scale agent 322a of the source DU 320a may request the scheduler to resume uplink/downlink resource allocation for the migration target UE.

p) The scale agent 322a of the source DU 320a may request the scheduler to transfer uplink/downlink resource allocation information about the migration target UE to the scale agent 322b of the target DU 320b. According to various embodiments, scheduling information may be continuously transferred until the migration of the RU 330 is complete.

q) The scale agent 322a of the source DU 320a may transmit source DU address and/or target DU address information to the FH splitter 331.

r) The target DU may prepare for transmission data according to the uplink/downlink resource allocation information and transmit it to the FH splitter 331 or receive from the FH splitter 331.

s) Upon receiving a C-plane message (ORAN fronthaul 7.2x standard) from the target DU 320b, the FH splitter 331 may process it as follows. According to various embodiments, since the RU 330 is unable to know the new target DU 320b, the FH splitter 331 may change to the MAC address of the source DU 320a and transmit it to the RU 330. At least one of FrameID, SubframeID, SlotID, SymbolID, and SectionID of the C-Plane Packet may be stored. As an example, in the case of uplink, if receiving a packet that uses the MAC address of the source DU 320a as the destination address from the RU 330, it may identify at least one of FrameID, SubframeID, SlotID, SymbolID, and SectionID and, if matching a stored one, change the destination address to the MAC address of the target DU 320b. As an example, in the case of downlink, upon receiving the U-plane packet from the target DU 320b, the RU 330 is unable to know the changed target DU 320b and may thus change to the MAC address of the source DU 320a and transmit to the RU 330.

t) In the processes h to s, a series of processes from selecting the UE to be processed by the target DU 320b among the UEs connected to the migration target RU 330 by the control agent 322a of the source DU 320a to receiving the C-plane message from the target DU and transmitting the MAC address of the source DU 320a to the migration target RU by the FH splitter 331 may be repeated until all UEs connected, directly or indirectly, to the migration target RU are migrated to the target DU 320b.

u) The scale agent 322a of the source DU 320a may request the scale agent 322b of the target DU 320b to process scheduling of the migration RU.

v) The scale agent 322a of the source DU 320a may notify the scaling controller 312 that migration to the migration RU is complete and remove information about the RU for which migration has been complete. According to various embodiments, the scale agent 322a of the source DU 320a may maintain information about the RU for which migration has been complete and receive information about the RU from the scale agent 322b of the target DU 320b and proceed with synchronization.

w) The scaling controller 312 may notify the F1 splitter 311 and the FH splitter 331 that migration of the RU 330 has been complete. As an example, the F1 splitter 311 may perform IP address-based network address translation (NAT) to switch the data which is directed to the migrated RU 330. The FH splitter 331 may perform medium access control (MAC) address-based network address translation (NAT) to switch the data directed from the migrated RU 330 to the target DU 320b.

2) Scaling in Process a) The scale agent 322a of the source DU 320a may periodically report the resource status, such as CPU usage of DU server, memory usage, network throughput, power consumption, accelerator usage (FPGA/GPU/smart NIC), etc., to the scaling controller 312. According to various embodiments, the scaling agent 322a may report the resource status when a resource use condition preset by the scaling controller 312 is satisfied, instead of periodically reporting to the scaling controller 312.

b) The scaling controller 312 may select (scaling decision) the DU (target DU) to scale in based on the resource usage information of the DU 320 and select the RU (e.g., 330c) to switch from the first server (e.g., 232c of FIG. 2B) to another server (e.g., 232b of FIG. 2B) among the RUs 330 processing the target DU service and process it. According to various embodiments, the scaling in target DU (target DU 320b) may be selected by various policies. As an example, if the resources allocated to the target DU 320b are allocated to be able to process three RUs (e.g., 330a, 330b, and 330c of FIG. 3B) with respect to 30% of the peak throughput of the RUs, and one RU (e.g., 330a of FIG. 3B) is currently connected so that 20% of the processable capacity (90% in total) is being used, scaling in may commence. Or, the scaling controller 312 may select the optimal DU to scale through artificial intelligence/machine learning technology. The scaling controller 312 may select the RU 330 according to various policies. As an example, the scaling controller 312 may select an RU (e.g., 330c of FIG. 3B) with a throughput smaller than the average among the RUs (e.g., 330a, 330b, and 330c of FIG. 3B) processing the service of the transmitted in the server (e.g., 232c of FIG. 2B), execute the target DU 320b service in another server (e.g., 232b of FIG. 2B), and switch to allow the corresponding RU 330c to process. Or, the scaling controller 312 may select the RU with the largest throughput and allow the source DU 320a capable of processing the corresponding capacity to process the migration target RU.

c) The scaling controller 312 may select (scale in server selection) a server (e.g., 232b in FIG. 2b) with processing capacity enough to process the target DU 320b service and execute it in the corresponding server. According to various embodiments, the selection of the server for executing the target DU 320b service may be performed according to various policies. As an example, the scaling controller 312 may select a server capable of processing the peak data rate among several RUs or select a server capable of processing the average rate. The selection of the scaling in target server may be related to the policy of selecting the scaling in target RU. If the scaling in target RU (RU where processing is migrated to the target DU service) has a throughput of 20% of the peak, the scaling controller 312 may migrate the corresponding RU to the DU (e.g., the source DU 320a), which is using the resource of 20% or less than the scaling out reference value among the target DUs 320b. According to various embodiments, recover of the resource being used by the service of the DU (e.g., the target DU 320b) may be performed typically through a cloud environment, e.g., Kubernetes. The resource-recovered server (e.g., 232c of FIG. 2B) may be removed from the cloud environment. Or, the target DU 320b may be removed by migrating the corresponding RU to the source DU 320a from the target DU 320b, which is using smaller resources. The scaling controller 312 may provide information capable of deleting the service of the DU (e.g., the target DU 320b) in the cloud environment.

d) The scaling controller 312 may modify (when the target DU 320b scales in a server different from the source DU 320a) or delete (when the target DU 320b scales in the same server as the source DU 320a) the information about the scaling in target DU 320b registered with the F1 splitter 311.

e) The scaling controller 312 may modify (when the target DU 320b scales in a server different from the source DU 320a) or delete (when the target DU 320b scales in the same server as the source DU 320a) the information about the scaling in target DU 320b registered with the fronthaul splitter 331.

f) The scaling controller 312 may instruct creation of a communication session for synchronizing context between the scale agents 322a and 322b in the source DU 320a and the target DU 320b.

g) The scale agent 322b of the target DU 320b may start transmitting the context for the RU (e.g., 330c) that is the migration target to the scale agent 322a of the source DU 320a and continue updating changes in the context. According to various embodiments, the context may include at least one of UE Context, Channel State, Radio Resource Scheduling Information, and System Information.

h) The scaling agent 322b of the target DU 320b may select a UE to be processed in the source DU 320a from among at least one or more UEs configured to be connected, directly or indirectly, to the migration target RU (e.g., 330c of FIG. 3B). According to various embodiments, the scaling agent 322b may select the migration target RU (e.g., 330c of FIG. 3B) according to various policies. As an example, shifted from the UE in the inactive state, the UE may be sequentially selected from among the UEs in the RRC connected state in order from the UE with smallest data transmissions to the UE with the largest data transmissions. Or, the DRB QoS values of the UEs may be compared, and selection may be performed in order of lower priority.

n) The scale agent 322b of the target DU 320b may transmit information about the migration target UE to the scale agent 322a of the source DU 320a. According to various embodiments, the scale agent 322b of the target DU 320b may send information about the RU to the scale agent 322a of the source DU 320a, before transmitting the information about the UE. According to various embodiments, the information about the UE may include the signaling ratio bearer (SRB) list and data radio bearer (DRB) list.

j) The scale agent 322b of the target DU 320b may request the F1 splitter 311 to send data, which is directed to the migration target UE, to the source DU 320b. According to various embodiments, the F1 splitter 311 may transmit all data directed to the migration target UE to the source DU 320a. In other words, the data flow may be switched from the target DU 320b to the source DU 320a.

k) The scale agent 322b of the target DU 320b may request the scheduler 324b to stop uplink/downlink resource allocation for the migration target UE.

l) The scale agent 322b of the target DU 320b may transmit the uplink/downlink data currently remaining in the scale agent 322a of the source DU 320a.

m) The source DU 320a may reset the buffer with the data received from the F1 splitter 311, comprising circuitry, and the target DU 320b and prepare to transmit/receive UE data.

n) The scale agent 322a of the source DU 320a may notify the scale agent 322b of the target DU 320b that data transmission/reception preparation for the UE has been complete.

o) The scale agent 322b of the target DU 320b may request the scheduler 324b to resume uplink/downlink resource allocation for the migration target UE.

p) The scale agent 322b of the target DU 320b may request the scheduler 324b to transfer uplink/downlink resource allocation information for the migration target UE to the scale agent 322a of the source DU 320a. According to various embodiments, the scale agent 322b of the target DU 320b may keep transferring the scheduling information until the migration of the migration target RU is complete.

q) The scale agent 322b of the target DU 320b may transmit source DU address and target DU address information to the FH splitter 331.

r) The source DU 320a may prepare for transmission data according to the uplink/downlink resource allocation information and transmit it to the fronthaul splitter 331 or receive from the fronthaul splitter 331.

s) Upon receiving a C-plane message (ORAN fronthaul 7.2x standard) from the source DU 320a, the fronthaul splitter 331 may change into the MAC address of the target DU 320b and then transmit to the RU, and store at least one of the FrameID, SubframeID, SlotID, SymbolID, and SectionID of the C-plane packet. According to various embodiments, in the case of uplink, if receiving a packet that uses the MAC address of the target DU 320b as the destination address from the RU 330, the fronthaul splitter 331 may identify at least one of FrameID, SubframeID, SlotID, SymbolID, and SectionID and, if matching a stored one, change the destination address to the MAC address of the source DU 320a. According to various embodiments, in the case of downlink, upon receiving the U-plane packet from the target DU 320b, the fronthaul splitter 331, comprising circuitry, may change into the MAC address of the source DU 320a and transmit the changed address to the RU.

t) The processes h to s may be repeated on each UE until all the UEs configured to be connected to the migration target RU are migrated to the source DU 320a.

n) The scale agent 322b of the target DU 320b may request the scale agent 322a of the source DU 320a to process scheduling of the migration target RU (e.g., 330c).

v) The scale agent 322b of the target DU 320b may notify the scaling controller 312 that migration of the migration target RU (e.g., 330c of FIG. 3B) is complete and remove information about the migrated RU (e.g., 330c of FIG. 3B).

w) The scaling controller 312 may notify the F1 splitter 311 and/or the fronthaul splitter 331 that migration of the RU (e.g., 330c) is complete.

x) When there is no RU 330 processed by the target DU 320b, the scaling controller 312 may delete the instance of the target DU 320b.

According to various embodiments, there is proposed software and a device including an F1 splitter decoupling a CU and a DU in a 5G RAN system including the CU, the DU, and a RU, a fronthaul splitter decoupling the DU and the RU, a scaling controller controlling a scaling process according to a server resource state, and a scaling agent controlling a data flow necessary for scaling in the DU while communicating with the scaling controller and processing inter-DU context synchronization.

According to various embodiments, when the resource allocated to the UE is migrated from the source DU to the target DU using the scheduler in charge of resource allocation in the DU, the radio bearer may be seamlessly controlled.

According to various embodiments, in a data flow between the source DU and the UE, a switch to the data flow for the RU and target DU may be possible based on the Frame ID, Subframe ID, Slot ID, Symbol ID, and Section ID information for switching the data flow between the target DU and the UE.

According to various embodiments, as much server resource as needed according to the traffic of the RU may be allocated to the DU 320 through server resource pooling of the cloud platform instead of allocating a dedicated DU to the RU 330. As a result, a server resource may be secured, so that the number of servers may be reduced, and power consumption may be decreased.

According to various embodiments, the resource pool may indicate a state in which a resource, e.g., one or more servers or storage, may be secured and be provided at the user's request and may be implemented in a virtual space. In the cloud environment, it is possible to provide resources at the user's request through a minimum or reduced process or immediately through a pre-secured resource pool.

The electronic device according to various embodiments may be one of various types of electronic devices. The electronic device may include, e.g., the carrier's base station system and a private network device (private 5G system). According to an embodiment, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each module herein may comprise circuitry.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or through the mobile communication operator's distribution system. If distributed online, at least part of the computer program product may be temporarily generated or at least temporarily stored in the machine-readable storage medium, such as memory of the manufacturer's server, a server of the application store, or a relay server. Each server herein comprises processing circuitry.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A device of a radio access network including a distributed unit (DU), the device comprising:
    a first DU, comprising circuitry, configured to communicate with a plurality of remote unit (RUs), comprising circuitry;
    a scaling controller, comprising circuitry, configured to obtain resource usage information about the first DU; and
    a second DU, comprising circuitry, selected by the scaling controller based on resource usage information about the first DU,
    wherein the scaling controller is configured to select at least one RU, comprising circuitry, to migrate to the second DU from among the plurality of RUs for processing a service of the first DU,
    wherein the first DU is configured to transmit information about the at least one RU to the second DU, and
    wherein at least one remaining RU, comprising circuitry, except for the at least one RU, among the plurality of RUs, remains to process the service of the first DU.

2. The device of claim 1, wherein the scaling controller is configured to obtain the resource usage information about the first DU from a first server, and wherein the scaling controller is configured to select a second server having capacity to execute a service of the second DU.

3. The device of claim 1, wherein the scaling controller is configured to obtain the resource usage information about the first DU from a first server, and wherein the second DU is to be selected as the second DU to process at least a portion of the service of the first DU using a second server different from the first server, based on the resource usage information for the first DU satisfying a condition associated with a resource available to the first server.

4. The device of claim 1, wherein information about the at least one RU includes a signaling radio bearer (SRB) list and/or a data radio bearer (DRB) list for a migration target UE.

5. The device of claim 1, wherein information about the at least one RU includes at least one of information regarding a UE related to the at least one RU, information about a channel state, radio resource scheduling information, or system information.

6. The device of claim 1, wherein the first DU is configured to create a communication session for synchronizing information about the at least one RU which is the migration target to the second DU.

7. The device of claim 1, wherein the second DU is configured to select a UE to be processed by the second DU from among at least one UE configured to be connected to the at least one RU.

8. The device of claim 1, wherein the first DU is configured to transmit information about a migration target UE to the second DU, and
    wherein the migration target UE is configured to process a service for the second DU.

9. The device of claim 1, further comprising an F1 splitter configured to connect the first DU and the second DU with a central unit (CU),
    wherein the F1 splitter is configured to switch a data flow from the first DU and transmit the data flow to the second DU.

10. The device of claim 1, further comprising:
    an F1 splitter configured to connect the first DU and the second DU to a central unit (CU); and
    a fronthaul (FH) splitter configured to connect the first DU and the second DU to the plurality of RUs,
    wherein the scaling controller is configured to register information about a service of the second DU with each of the F1 splitter and the FH splitter.

11. A method of communication by a radio access network device including a distributed unit (DU), the method comprising:
    obtaining information about resource usage of a first DU by a scaling controller;
    selecting a second DU based on the information about the resource usage of the first DU by the scaling controller;
    selecting at least one remote unit (RU) to migrate to the second DU from among a plurality of RUs configured to process a service of the first DU by the scaling controller; and
    transmitting information about the at least one RU to the second DU, by the first DU,
    wherein at least one remaining RU, except for the at least one RU among the first plurality of RUs, remains to process the service of the first DU.

12. The method of claim 11, further comprising:
    obtaining the information about the resource usage of the first DU from a first server, and
    selecting a second server having capacity to execute a service of the second DU by the scaling controller.

13. The method of claim 11, further comprising obtaining the information about the resource usage of the first DU from a first server, and wherein selecting the second DU includes selecting the second DU to process at least a portion of the service of the first DU using a second server different from the first server, based on the resource usage for the first DU satisfying a condition associated with a resource available to the first server.

14. The method of claim 11, wherein information about the at least one RU includes a signaling radio bearer (SRB) list and/or a data radio bearer (DRB) list for a migration target UE.

15. The method of claim 11, wherein information about the at least one RU includes at least one of information regarding a UE related to the at least one RU, information about a channel state, radio resource scheduling information, or system information.

16. The method of claim 11, further comprising instructing the first DU to create a communication session for synchronizing information about the at least one RU which is the migration target to the second DU, by the scaling controller.

17. The method of claim 11, further comprising selecting a UE to be processed by the second DU from among at least one UE configured to be connected to the at least one RU by the second DU.

18. The method of claim 11, further comprising transmitting information about a migration target UE to the second DU by the first DU,
   wherein the migration target UE processes a service for the second DU.

19. The method of claim 11, wherein the radio access network device further includes an F1 splitter configured to connect the first DU and the second DU with a central unit (CU), and
   wherein the method further comprises requesting the F1 splitter to switch a data flow from the first DU and transmit the data flow to the second DU by the first DU.

20. The method of claim 11, wherein the radio access network device further includes:
   an F1 splitter configured to connect the first DU and the DU to a central unit (CU); and
   a fronthaul (FH) splitter configured to connect the first DU and the second DU to the plurality of RUs,
   wherein the method further comprises registering information about a service of the second DU with each of the F1 splitter and the FH splitter by the scaling controller.

\* \* \* \* \*